United States Patent
Becker

(10) Patent No.: US 10,209,867 B1
(45) Date of Patent: Feb. 19, 2019

(54) ELECTRONIC DOCUMENTATION INTEGRATION AND VIEWING SYSTEM

(71) Applicant: Jordan M. Becker, Los Altos, CA (US)

(72) Inventor: Jordan M. Becker, Los Altos, CA (US)

(*) Notice: Subject to any disclaimer, the term of this patent is extended or adjusted under 35 U.S.C. 154(b) by 270 days.

(21) Appl. No.: 15/136,908

(22) Filed: Apr. 23, 2016

Related U.S. Application Data

(60) Provisional application No. 62/162,047, filed on May 15, 2015.

(51) Int. Cl.
| | |
|---|---|
| *G06F 3/048* | (2013.01) |
| *G06F 3/0483* | (2013.01) |
| *G06F 17/30* | (2006.01) |
| *G06F 3/0484* | (2013.01) |
| *G06F 3/0485* | (2013.01) |
| *G06F 3/0486* | (2013.01) |
| *G06K 9/00* | (2006.01) |

(52) U.S. Cl.
CPC .......... *G06F 3/0483* (2013.01); *G06F 3/0485* (2013.01); *G06F 3/0486* (2013.01); *G06F 3/04842* (2013.01); *G06F 17/30011* (2013.01); *G06F 17/30598* (2013.01); *G06F 17/30601* (2013.01); *G06F 17/30905* (2013.01); *G06K 9/00456* (2013.01); *G06K 2209/01* (2013.01)

(58) Field of Classification Search
CPC .................. G06F 3/0485; G06F 17/30126
See application file for complete search history.

(56) References Cited

U.S. PATENT DOCUMENTS

| | | | | |
|---|---|---|---|---|
| 5,142,619 A * | 8/1992 | Webster, III | .............. | G06F 7/02 715/234 |
| 5,877,760 A * | 3/1999 | Onda | .................... | G06F 3/0334 715/784 |
| 6,020,887 A * | 2/2000 | Loring | ................ | G06F 3/04855 715/786 |
| 6,064,968 A * | 5/2000 | Schanz | .................. | G06Q 50/18 705/2 |
| 6,243,093 B1 * | 6/2001 | Czerwinski | ......... | G06F 3/04815 707/E17.142 |
| 6,248,946 B1 * | 6/2001 | Dwek | ............... | G06F 17/30749 434/307 A |
| 6,374,273 B1 * | 4/2002 | Webster | ................ | G06F 17/211 707/E17.121 |

(Continued)

*Primary Examiner* — Ryan F Pitaro

(57) ABSTRACT

A Document Integration and Viewing System (DIVS) can perform a method that comprises accessing a plurality of electronic documents, assigning each of the electronic documents to an appropriate category of a plurality of user-specified document categories, establishing a sequence for the electronic documents in each of the user-specified document categories, and generating a graphical user interface that includes a plurality of panes. Each of the user-specified document categories is assigned to a different pane of the plurality of panes so that each of the electronic documents is assigned to a corresponding one of the panes. Within each pane, all of the electronic documents assigned to the pane are viewable sequentially in response to user inputs according to the sequence determined for the electronic documents of the corresponding category, with seamless visual transitions between contents of the electronic documents assigned to each pane.

20 Claims, 5 Drawing Sheets

(56) References Cited

U.S. PATENT DOCUMENTS

| | | | | |
|---|---|---|---|---|
| 6,560,620 B1* | 5/2003 | Ching | G06F 17/27 | 707/999.202 |
| 6,658,626 B1* | 12/2003 | Aiken | G06F 17/2211 | 707/E17.039 |
| 7,047,486 B1* | 5/2006 | Nagao | G06F 17/30707 | 707/999.006 |
| 7,673,340 B1* | 3/2010 | Cohen | G06F 11/3438 | 379/266.08 |
| 7,689,457 B2* | 3/2010 | Chan | G06F 17/30867 | 705/14.53 |
| 7,996,282 B1* | 8/2011 | Scott | G06Q 30/06 | 705/27.1 |
| 8,881,002 B2* | 11/2014 | Veselov | G06F 17/212 | 715/243 |
| 8,918,720 B1* | 12/2014 | Wu | G06F 17/30867 | 707/610 |
| 9,294,537 B1* | 3/2016 | Zuccarino | H04L 67/02 | |
| 9,361,640 B1* | 6/2016 | Donsbach | G06Q 30/0633 | |
| 2002/0111968 A1* | 8/2002 | Ching | G06F 17/30855 | 715/229 |
| 2003/0037050 A1* | 2/2003 | Monteverde | G06F 17/30864 | |
| 2004/0216057 A1* | 10/2004 | Wyle | G06F 17/30017 | 715/810 |
| 2005/0102202 A1* | 5/2005 | Linden | G06Q 30/02 | 705/26.7 |
| 2005/0114324 A1* | 5/2005 | Mayer | G06F 17/30864 | |
| 2005/0138066 A1* | 6/2005 | Finke-Anlauff | G06F 17/30044 | |
| 2005/0160360 A1* | 7/2005 | Nadamoto | G06F 17/30873 | 715/234 |
| 2005/0165744 A1* | 7/2005 | Taylor | G06F 17/30864 | |
| 2005/0193094 A1* | 9/2005 | Robbin | G06F 17/30058 | 709/219 |
| 2006/0277488 A1* | 12/2006 | Cok | G06F 3/04855 | 715/784 |
| 2007/0005581 A1* | 1/2007 | Arrouye | G06F 17/30126 | |
| 2007/0067712 A1* | 3/2007 | Baker | G06F 17/3089 | 715/234 |
| 2008/0022199 A1* | 1/2008 | Sako | G06F 17/30274 | 715/273 |
| 2008/0228734 A1* | 9/2008 | Kang | G06F 17/30997 | |
| 2009/0055413 A1* | 2/2009 | Audet | G06F 17/30994 | |
| 2009/0150822 A1* | 6/2009 | Miller | G06F 3/0485 | 715/784 |
| 2009/0241040 A1* | 9/2009 | Mattila | G06F 3/0481 | 715/760 |
| 2009/0241053 A1* | 9/2009 | Augustine | G06Q 10/105 | 715/772 |
| 2009/0287559 A1* | 11/2009 | Chen | G06F 17/30867 | 705/14.23 |
| 2009/0327878 A1* | 12/2009 | Grandison | G06F 17/30719 | 715/256 |
| 2010/0169823 A1* | 7/2010 | Audet | G06F 3/0481 | 715/784 |
| 2010/0179949 A1* | 7/2010 | Safar | G06F 17/30905 | 707/707 |
| 2010/0293458 A1* | 11/2010 | Rolleston | H04N 1/6011 | 715/274 |
| 2011/0302510 A1* | 12/2011 | Harrison | G06F 17/30899 | 715/760 |
| 2012/0131507 A1* | 5/2012 | Sparandara | G16H 10/60 | 715/833 |
| 2012/0304074 A1* | 11/2012 | Ooi | G06F 3/04895 | 715/752 |
| 2013/0047080 A1* | 2/2013 | Kroeger | G06F 17/212 | 715/273 |
| 2013/0061169 A1* | 3/2013 | Pearcy | G06F 21/552 | 715/788 |
| 2013/0080888 A1* | 3/2013 | Audet | G06F 17/30994 | 715/277 |
| 2013/0086511 A1* | 4/2013 | Parsons | G06F 3/0483 | 715/784 |
| 2013/0174025 A1* | 7/2013 | Lee | G06F 17/2288 | 715/251 |
| 2013/0185657 A1* | 7/2013 | Gunawardena | G06F 17/241 | 715/753 |
| 2013/0198677 A1* | 8/2013 | Dash | G06F 3/0488 | 715/776 |
| 2013/0254308 A1* | 9/2013 | Rose | H04N 21/252 | 709/206 |
| 2013/0326398 A1* | 12/2013 | Zuverink | G06F 3/048 | 715/784 |
| 2014/0058840 A1* | 2/2014 | Chakrabarty | G06F 3/0481 | 705/14.55 |
| 2014/0096042 A1* | 4/2014 | Travis | G06F 3/0484 | 715/760 |
| 2014/0281952 A1* | 9/2014 | Zhang | G06F 17/30873 | 715/273 |
| 2014/0325437 A1* | 10/2014 | Pacenta | G06F 3/04883 | 715/793 |
| 2014/0380246 A1* | 12/2014 | Blundell | G06F 17/30899 | 715/854 |
| 2015/0020011 A1* | 1/2015 | Roberts | G11B 27/28 | 715/767 |
| 2015/0081281 A1* | 3/2015 | Bustelo | G06F 17/2735 | 704/10 |
| 2015/0169518 A1* | 6/2015 | Antipa | G06F 17/24 | 715/240 |
| 2015/0242456 A1* | 8/2015 | Cannon | H04L 65/403 | 707/608 |
| 2015/0355833 A1* | 12/2015 | Feltham | G06F 3/04855 | 715/784 |
| 2016/0026609 A1* | 1/2016 | Adams | G06F 17/2235 | 715/205 |
| 2016/0173944 A1* | 6/2016 | Kilar | H04N 21/4516 | 725/12 |
| 2016/0364387 A1* | 12/2016 | DiGirolamo | G06F 17/30011 | |
| 2017/0115842 A1* | 4/2017 | Yin | G06F 3/0485 | |
| 2017/0115852 A1* | 4/2017 | Ficklin | G06F 17/30126 | |
| 2017/0139565 A1* | 5/2017 | Choi | G06F 3/0483 | |
| 2017/0154014 A1* | 6/2017 | Arnold | G06F 17/2241 | |
| 2017/0366862 A1* | 12/2017 | Ash | H04N 21/4826 | |
| 2018/0053116 A1* | 2/2018 | Cai | G06N 7/005 | |
| 2018/0061285 A1* | 3/2018 | Gilbert | G09F 15/005 | |

\* cited by examiner

ELECTRONIC DOCUMENTATION INTEGRATION AND VIEWING SYSTEM

This application claims the benefit of U.S. provisional patent application No. 62/162,047, filed on May 15, 2015, which is incorporated by reference herein in its entirety.

FIELD OF THE INVENTION

At least one embodiment of the present invention pertains to integration, management and viewing of electronic documents.

BACKGROUND

Certain businesses and professions have traditionally relied upon physical file folders to hold physical (paper) documents that are received and created in the course of doing business. For example, attorneys have traditionally used bi-fold and tri-fold folders to hold documents for each particular matter. These folders allow different types of documents for a given matter to be organized in a logical way within the same physical file. For example, documents representing communications (e.g., letters and emails) between an attorney and a client and/or service providers may be attached to the inside of one flap of a tri-fold folder, while communications with a government agency may be clipped to the inside of another flap of the same tri-fold folder, and while the attorney's notes and/or other supporting documents are clipped to the inside of a third flap of the tri-fold folder. Still other documents may be held loosely in one or more pockets within the folder. Commonly, at least some of these documents are attached inside the file folder in a particular sequence, such as in the chronological order in which they were created or received, and this may be true for each of one or more different sections (e.g., flaps) within the folder.

Computers, along with decreasing costs of data storage technology, have made physical file folders redundant in many respects, for at least some business and professions. Indeed, the business world has been steadily gravitating toward a "paperless" system, in which all documents are maintained only in electronic form. A paperless business has many benefits, including being environmentally friendly and reducing costs associated with purchasing paper and storage space for physical files. Many businesses use a computer-implemented document management system (DMS) to store files electronically. A DMS makes it easy to store essentially all documents created or received for a given matter in an electronic folder dedicated for that matter. Essentially any number of subfolders can be created within a given matter folder, to help organize documents. Further, a DMS may facilitate searching of folders and files by keyword and/or predefined fields and may provide for automatic backup of data.

However, a physical file system may still have some advantages over today's electronic file system. For example, with a completely paperless file system it can be difficult for a person to acquire and maintain a solid understanding of the matter as a whole or its context, particularly if the person has not worked on the matter from its inception. Typically each document is stored as a separate electronic file. The internal contents of any particular page within any particular electronic document in a DMS (or other electronic file system) are not randomly or instantly viewable as they are in a physical file folder. A person cannot rapidly flip through arbitrarily sized chunks of pages that span multiple documents, as they can with a physical file. Typically each individual electronic document is opened and viewed and then scrolled or paged to the location(s) or interest with those documents. This process can prove unwieldy, especially for matters that include a large number of documents, where users may need to switch back and forth between several different documents displayed in different windows on a computer screen. A user can easily miss or overlook important information because of the electronic file system's limitations in the way the information is organized and viewable by the user. Additionally, while a DMS or conventional operating system's file manager can list all stored files, organized hierarchically by folders and subfolders, for example, and sorted by any of various criteria (e.g., name, creation date or last modified, file type, etc.), the contents or relevance of those documents may not be apparent to the user from that listing.

These and other limitations of electronic document storage systems can hinder a person's ability to obtain or maintain an understanding of a complex matter that has numerous documents of different types and purposes, and may cause a user to overlook important information.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
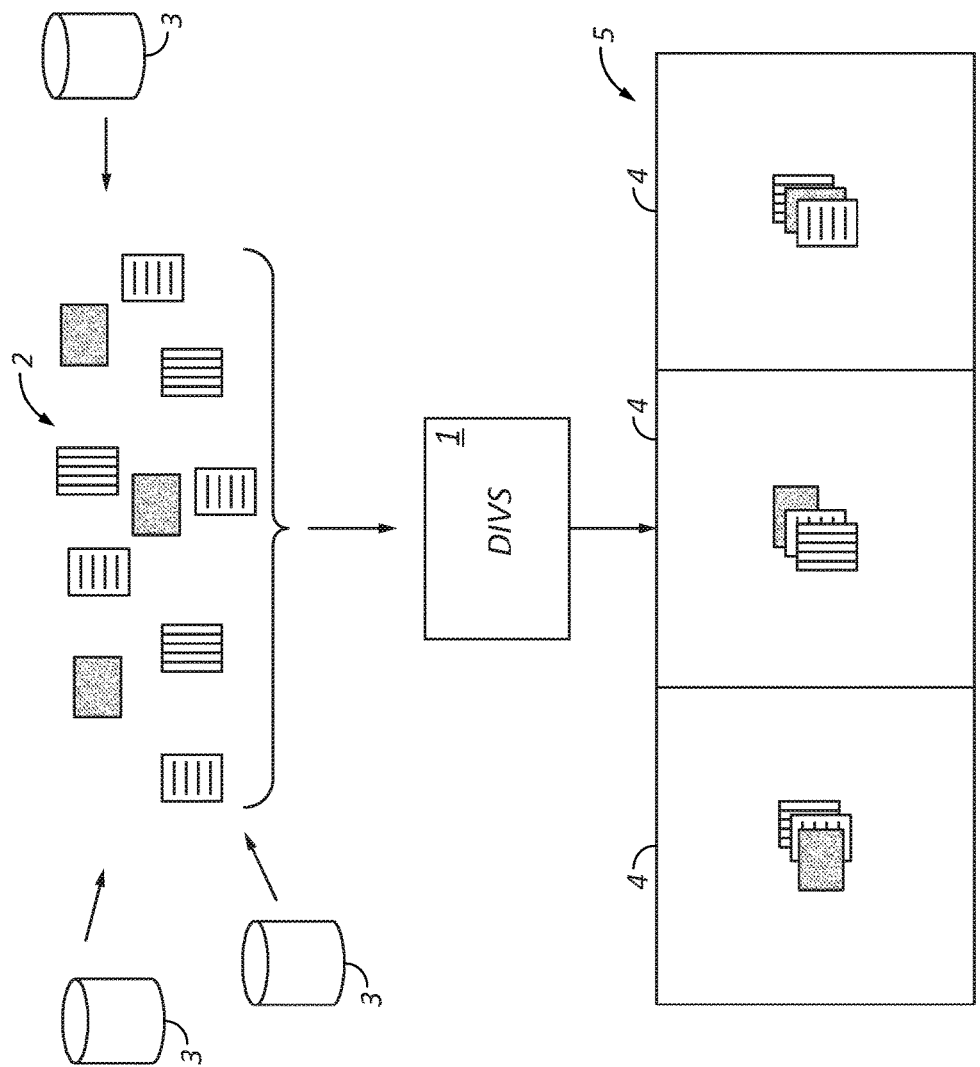
FIG. 1 illustrates schematically an example of the functionality of an electronic Document Integration and Viewing System (DIVS).

Referring to FIG. 1, introduced here is a Document Integration and Viewing System (DIVS) 1 that can automatically integrate multiple electronic documents 2 of different file types and purposes but relating to the same matter, and then make the contents of those documents 2 viewable in a manner that emulates a traditional multi-fold physical file both in appearance and in how a user can interact with the documents. The DIVS 1 thereby makes it easier for a person to view and assimilate all of the documents associated with a matter and to locate quickly and easily the most relevant documents and content, as if they were present within a well-organized physical file folder.

In FIG. 1, the different fill patterns in the objects representing the electronic documents 2 represent different file types and/or formats. The multiple electronic documents 2 for a given matter may be obtained from one or more different content sources or storage facilities 3 (e.g., various memory locations, disk drives, remote computers). The multiple electronic documents 2 for a given matter can also be of various different file types and/or formats, such as emails (e.g., in Outlook.otf format or .msg format), word processing documents (e.g., in Microsoft Word .doc or .rtf format), PDF (.pdf) documents, drawings (e.g., in Microsoft Visio.vsd or PowerPoint.pptx format), web pages in.html format, images (e.g., in .jpg format), videos, etc.

In response to user inputs, the DIVS 1 creates an electronic file folder (a logical data container) for a given matter and assigns multiple electronic documents 2 relating to that matter to separate viewing panes 4 of an application window 5 for the matter, in a graphical user interface (GUI). The term "application window" in this context means a GUI window generated by the DIVS 1 in a manner consistent with the windows paradigm, but does not imply that the DIVS 1 must be application-level software, although it may be.

Each viewing pane 4 represents a different user-specified document category, such as "Client Communications," "Notes and Background Materials, "Official Government Documents," etc. To emulate the way the documents would be attached in a physical file folder, the DIVS 1 establishes a sequence for the documents in each category/pane, automatically or based on user input (or a combination thereof), and displays the documents in their assigned panes 4 in a logically stacked manner within each pane 4 according to the established sequence. Once the electronic documents 2 have been input to and processed by the DIVS 1, the DIVS 1 enables the user to scroll or page through the "stacked" documents in each pane 4 sequentially and seamlessly (i.e., without having to expressly open or select the documents/ files individually). That is, the electronic file boundaries between the documents become essentially transparent to the user. The documents within each pane 4 are scrollable as if they were a single multi-page document.

In response to a user's request to open an electronic file folder for a given matter, the DIVS 1 will automatically load some or all of the documents from long-term storage into working memory. For example, the first few documents in the sequence for each pane may be prefetched and loaded, while subsequent documents in the sequence may be fetched and loaded in response to the user's scrolling inputs.

Hence, the DIVS 1 provides a GUI that visually emulates a multi-fold physical file of the type traditionally used by various businesses and professions. As such, the DIVS 1 enables the user to obtain and maintain a better understanding of the overall context of a matter, including relationships between documents for that matter, and to more directly and easily access document contents than if the user had to identify and open them as separate files.

The multiple documents 2 processed by the DIVS 1 for a given matter can be of various different file types and/or formats, such as any of those mentioned above. Further, the documents assigned to each particular category and pane 4 can be of various different file types and/or formats, such as any of those mentioned above.

For each of the panes 4, the DIVS 1 enables the user to scroll or page through the contents of all of the electronic documents assigned to that pane seamlessly, i.e., without requiring the user to individually open or identify the electronic documents associated with that pane.

The DIVS 1 can be embodied as, for example, software stored in one or more memories and/or other storage devices, and executable by one or more processors, in a conventional computer system. The computer system can be, for example, a desktop computer, laptop or notebook computer, tablet computer, smartphone, wearable (e.g., head-mounted) computing device, or other type of computing device. Further, the DIVS 1 can be implemented in a single computing device or in a distributed manner across two or more computing devices. Further, the DIVS 1 can be implemented in a client-server architecture (e.g., as a cloud-based application), where the user input and displayed output of the DIVS 1 occurs on a client device and the other functionality of the DIVS 1 occurs on one or more servers that communicate with the client device over a network such as the Internet.

In embodiments where the DIVS 1 is implemented as software, it may be implemented, for example, as a stand-alone application, as part of a DMS, or as part of the file system or other component of a computer's operating system.

In some embodiments, the DIVS 1 converts all of the electronic documents for a matter into the same file type or format (e.g., PDF or a new file type) before making them viewable in the GUI. In other embodiments, at least some of the documents may be maintained in their native formats. In some embodiments, the DIVS 1 converts the contents of all of the electronic documents assigned to any given category/ pane into a single document. In other embodiments, the electronic documents assigned to each category/pane may be maintained as separate documents. The DIVS 1 can organize the individual documents assigned to each pane 4 by using, for example, a linked list or other data structure that relates the documents in each pane sequentially, using pointers to link the documents in each pane sequentially. The separate documents can be the original electronic documents in their native formats, or new documents created from the contents of the original documents, in a single common format or multiple different formats. Note, however, that even though the documents in each pane are organized sequentially, the user can randomly access any document directly (e.g., by selecting a displayed tab, as discussed below), and in at least some embodiments the user can directly access any given page of any given document by inputting its page number.

Figure 2:
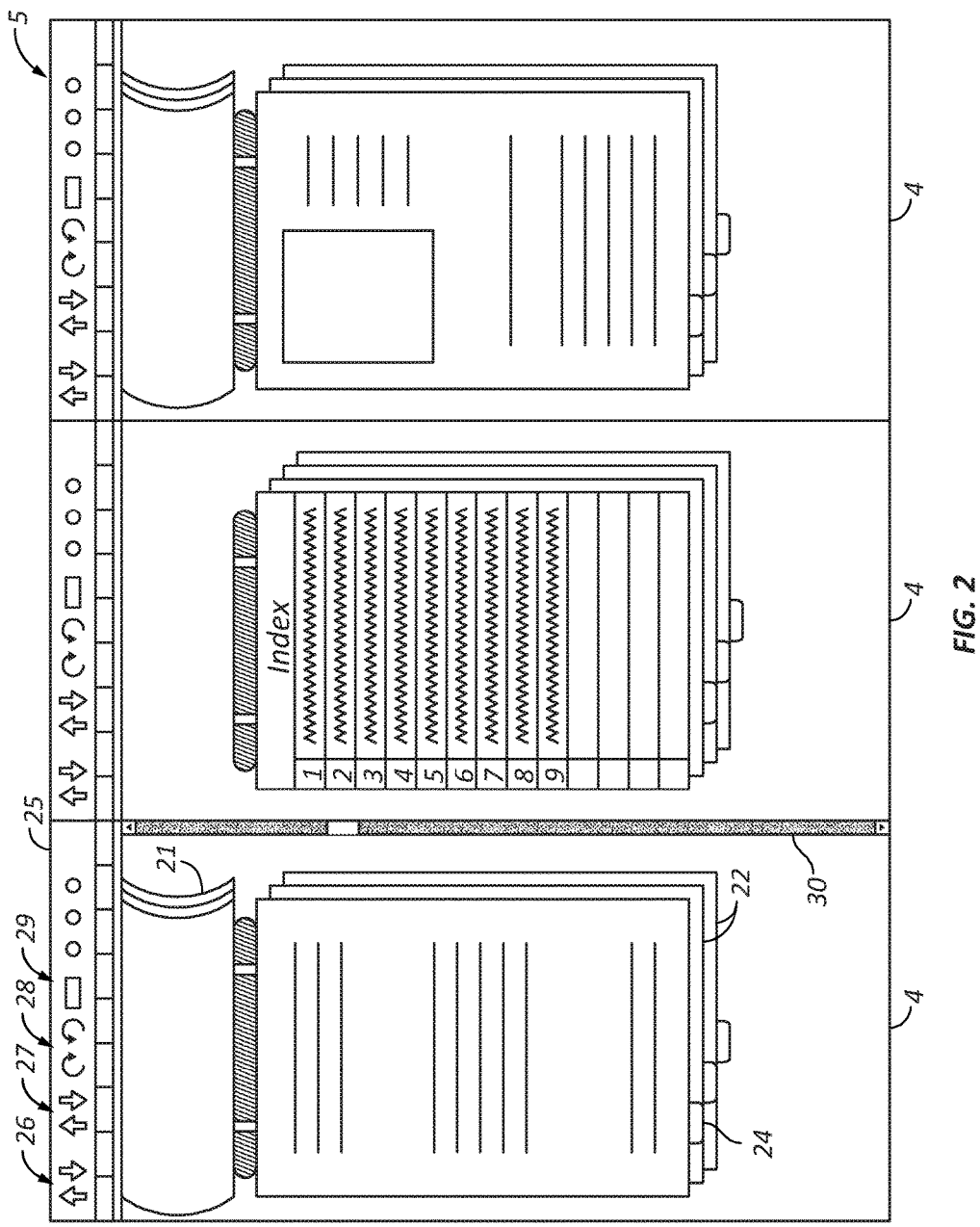
FIG. 2 illustrates an example of a GUI that the DIVS can generate.

FIG. 2 illustrates an example of a GUI that the DIVS 1 can generate. Note that the GUI may include additional features not shown or mentioned here. In the illustrated embodiment, the GUI includes an application window 5, with which the user can interact using any known or convenient input technique, such as a mouse pointer controlled by a mouse or touchpad, touch screen, voice commands, etc. The application window visually and functionally emulates the inside of a physical file folder for a particular matter. As such, the application window 5 includes multiple panes 4, where each pane 4 is analogous to a different section of a physical file folder and represents a different user-defined document category. The example of FIG. 2 visually emulates a type of physical file folder in which pages are attached to the inside of the folder at their top margins and can be paged through by flipping them vertically. The panes may include visual effects, such as effects 21 and 22 to give the appearance of physical pages through which the user can flip vertically. The application window 5 in FIGS. 1 and 2 includes three panes 4, however, an application window provided by the DIVS 1 can contain essentially any number of panes (e.g., as determined by the number of user-specified categories defined for a matter or a group of matters), although limited display screen area may make large numbers of panes/ categories undesirable. In some embodiments, the user can select which categories' panes 4 are displayed at any given time.

As mentioned above, each pane 4 is for displaying multiple documents of one particular category, in a particular sequence (e.g., chronological or alphabetical). For example, in an electronic file used by a law practice that deals with a government agency, the left pane in FIG. 2 might be designated for "Client Communications" while the middle pane is designated for "Notes and Background Materials" and the right pane is designated for "Official Government Documents." In some embodiments, the positions of the panes within the application window 5 can be modified by the user (e.g., by dragging and dropping). In some embodiments, one or more panes of an application window 5 may be split off into one or more additional application windows like application window 5, in a manner similar to splitting the contents of one physical file into two or more physical files.

The documents in each pane 4, or at least their contents, are logically connected in a sequence determined by the DIVS 1 (either based on or independently of user input). In some embodiments and/or viewing modes, each pane 4 displays only one page at a time, as shown in FIG. 2. In other embodiments and/or viewing modes, two or more pages may be displayed at a time in each pane 4. Each pane 4 may include an index or table of contents of its included documents, for example, as the top page in each pane, as shown in the middle pane in FIG. 2.

Each individual document represented in each pane 4 may be shown as having a tab, such as tab 24 in FIG. 2, which the user can select (e.g., click on or touch) to directly view the first page of that document. In some embodiments, the label on each tab is assigned at the time the document is input to the DIVS 1, automatically by the DIVS 1 or by user input, although it can be modified by the user at any time. The GUI also enables the user to add labeled tabs to other pages, to allow direct viewing of those pages.

Each pane 4 also includes various other GUI user controls. For example, each pane 4 may include a menu bar 25, page up/down buttons 26, document up/down buttons 27 (to jump to the next or previous document in the pane), rotation controls 28 to rotate documents 90 degree left or right, one or more input fields 29 into which the user can input a page or document number to which to jump and/or other commands/data, etc. Additionally, a pane 4 may include a scroll bar 30. The page up/down buttons 26, document up/down buttons 27 and scroll bar 30 in each pane may be used to seamlessly scroll through all of the pages and documents in a given pane/category.

In some embodiments or modes of operation, the user may simply click or tap on any pane 4 to cause the document currently displayed in that pane to be expanded to a larger view, e.g., so that the document occupies the entire application window 5 or is displayed in a new, larger application window.

In the example of FIG. 2, all of the panes 4 for a given file folder (matter) are contained within a single application window 5. In other embodiments, however, different panes of a given file folder (matter) may be displayed in separate, concurrently displayed application windows.

Figure 3:
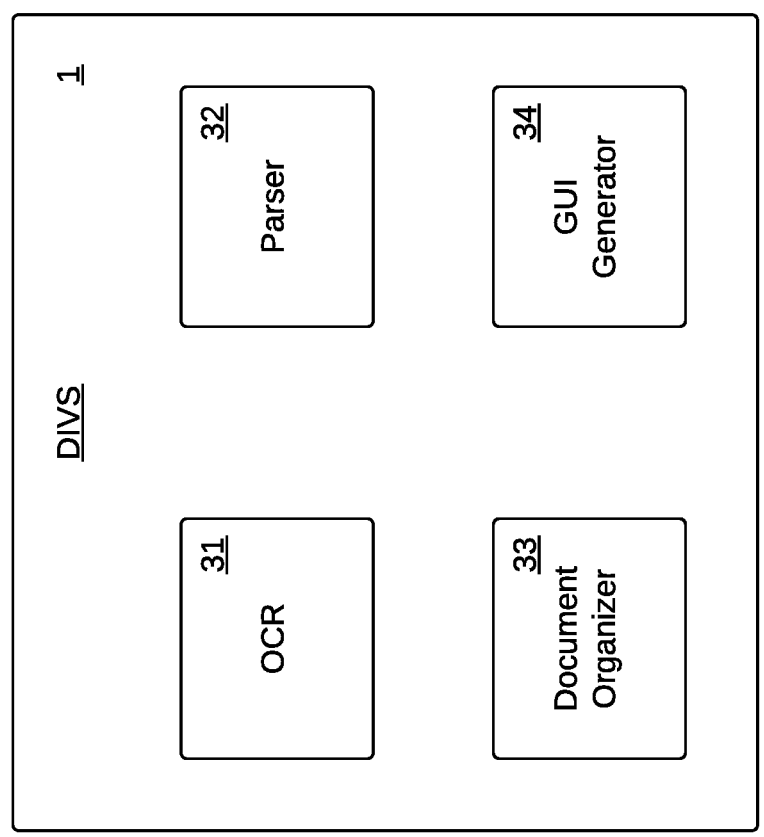
FIG. 3 is a block diagram showing an example of the elements of the DIVS.

FIG. 3 illustrates an example of the elements of the DIVS 1, according to at least some embodiments. In the illustrated example, the DIVS 1 includes an optical character recognition (OCR) module 31, a parser 32, a document organizer 33 and a GUI generator 34. The DIVS 1 may provide the ability to search the contents of the file folder by keyword and/or field name; accordingly, the OCR module 31 can be used to perform OCR on input electronic documents so as to produce searchable content from documents that are not searchable in their original format. Additionally, OCR can enable or facilitate parsing by the parser 32. The parser 32 identifies the relevant constituent elements of each electronic document input to the DIVS 1, such as its various headers, metadata, elements of content, etc. The GUI generator 34 generates the GUI described above, including the application window 5 and its included panes 4 and their included document contents and controls, and also receives and processes user inputs.

The document organizer 33 determines the appropriate pane 4 to which each input document is assigned and the sequence of documents within each pane. The assigned pane and the sequence of documents within each pane may be determined automatically, i.e., entirely by the document organizer 33, or based on user input, or a combination thereof. For example, the pane 4 to which a given document is assigned is based on the category to which the document is assigned; and the category to which the document is assigned may be determined automatically by the DIVS 1, or based on user input, or a combination of both. The DIVS 1 may be "intelligent" in that it may determine the category by examining, for example, the contents, metadata and/or context of the document and/or past category selections by a user, to determine (or at least suggest to the user) the most appropriate category for the document. For example, by detecting a particular name in a "To" or "From" header of an email, the document organizer 33 may reasonably determine that the email belongs in the pane for "Client Communications" if emails containing that name in a header have previously been associated with that category/pane. Similarly, by detecting certain text or characters within a document or its filename, and possibly based on past category selections by a user, the document organizer 33 may conclude that a given document belongs in a particular category/pane. Alternatively, or additionally, the DIVS 1 may prompt the user to specify the category (or confirm the suggested category) of each document, when the document is added to the file folder. Note that in some embodiments, a document can be assigned to multiple categories and therefore may be viewable by the user independently and concurrently in multiple panes.

With regard to the sequence of documents within a pane, the document organizer 33 can determine the sequence (or at least recommend a sequence to the user) based on, for example, time/date stamps associated with the documents, such as the creation dates of the documents and/or the dates the documents are added to the file folder for the matter (e.g., the dates they are first input to the DIVS 1). Which type of date is used for any given pane 4 can be configured as a user preference, and further, a hierarchical prioritization of date types can be specified for each pane 4 for the purpose of determining document sequence. Alternatively, or additionally, another criterion or criteria may be used to determine the sequence of documents. Further, the DIVS 1 may prompt the user to specify the sequential position of each document (or confirm the recommended position) relative to the other documents in its category/pane, when the document is added to the file folder. The GUI may also provide a control that enables the user easily to modify the position of any document within its assigned pane or to move or copy a document from one pane to another pane.

Figure 4:
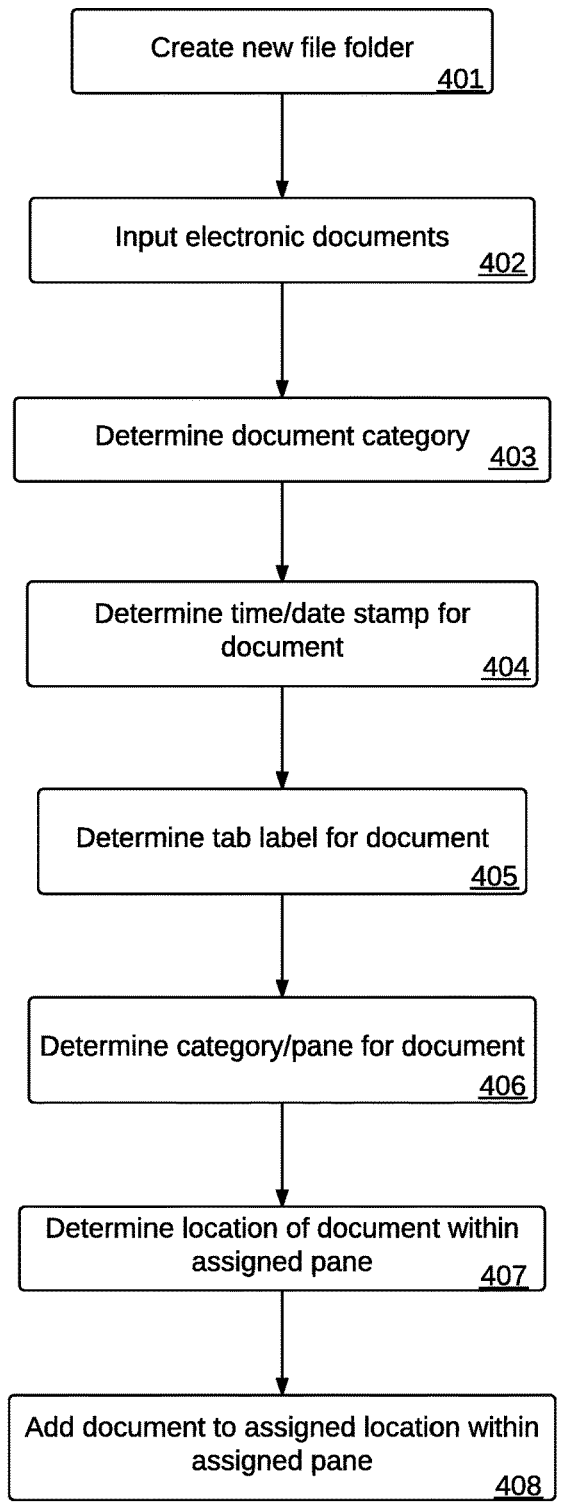
FIG. 4 is a flow diagram illustrating an example of a process that can be performed by the DIVS.

FIG. 4 illustrates an example of a process that can be performed by the DIVS 1. Initially, at step 401, in response to user input the DIVS 1 creates a new (electronic) file folder for a particular matter. In connection with this step, the DIVS 1 may prompt the user to provide a folder name. Next, at step 402 the DIVS 1 inputs one or more electronic documents, selected by the user, to be added to the file folder. The documents may be selected by the user and input to the DIVS 1 sequentially or as a batch. The selection of input documents by the user can be performed using any known or convenient technique for selecting files in a computing device. The following steps can then be performed by the DIVS 1 for each input document. The input documents can be processed one at a time or such that each step is performed for all input documents before moving to the next step. In some cases the following steps may be performed at the time each document is created and initially saved, or they may be performed on documents that were previously created and saved, or a combination thereof. Some or all of these steps may include displaying to the user one or more dialog windows or other similar GUI elements, in which the user can accept or modify values recommended by the DIVS 1 (e.g., for tab labels, document categories, sequential location within a pane, etc.).

In certain embodiments, the DIVS 1 then transforms each input document into the same file type or format, such as .pdf or a new file type. In other embodiments, the documents are kept in their native formats. Next, at step 403 the DIVS 1 determines a user-level document category for an input document. By "user-level" what is meant is a document category or type that is specified by a person and used by a person to organize documents by their contents or purpose (e.g., "Client Communications" or "Notes and background Materials"), which is typically not a file type or format commonly used by computer file systems to organize files (e.g. .doc, .pdf, .vsd). As noted above, the category may be determined automatically by the DIVS 1, or based on user input, or a combination thereof.

Next, at step 404 the DIVS 1 determines a time/date stamp for the document. The time/date stamp may be determined automatically by the DIVS 1 (e.g., based on the present date and time when the step is performed or based on metadata such as creation date or last modified date of the document), or based on user input, or a combination thereof. The time/date stamp can be used to determine, or to recommend to the user, a sequential position of the document within its assigned pane, once the pane is determined.

Next, at step 405 the DIVS 1 determines a tab label for the tab to be displayed for the document in the assigned pane, such as tab 24 in FIG. 2. The tab label may be determined automatically by the DIVS 1 (e.g., based on content in the document or metadata such as the filename or present date), or by user input, or a combination thereof.

Next, at step 406 the DIVS 1 determines the most appropriate pane (category) for the document and assigns the document to that category/pane. As described above, the pane/category may be determined automatically by the DIVS 1 (e.g., based on contents, metadata, context, past user inputs, etc.), or by user input, or a combination thereof. When the first documents are being added to a new file folder, the DIVS 1 may prompt the user to specify categories initially, either before adding any documents or as part of the process of adding the documents. The DIVS 1 may then learn from the user's initial category selections to enable it to make or recommend subsequent category selections for documents.

Next, at step 407 the DIVS 1 determines the appropriate sequential location within the assigned pane for the document, relative to the other documents already assigned to that pane (if any), and assigns the document to that location. The sequential location may be determined automatically by the DIVS 1 (e.g., based on the time/date stamp determined step 404, other metadata of the document, such as creation date or last modified date of the document, user input, or a combination thereof). In some embodiments or modes of operation, the DIVS 1 may, by default, assign the document currently being processed to the top or bottom position in its assigned pane (e.g., if the sequence in the pane is chronological, and depending on whether the user has selected the top or bottom to represent the most recent document position). In some embodiments, the DIVS 1 may display a dialog window with the filename (or other identifier) of the document highlighted in a list of all documents assigned to that pane, where the user may drag the filename (or other identifier) of the document up or down to a different position within the list to change the document's position within the pane relative to the other documents.

Finally, at step 408 the DIVS 1 adds the document (in its entirety or relevant portions of its contents) to its assigned pane in its assigned sequential location. The DIVS 1 also may update an index or table of contents of that assigned pane to reflect the newly added document.

Note that in some embodiments, the order of the above-mentioned steps may be different from that described above. Further, in some embodiments, some of these steps may be omitted and/or additional steps not described here may be performed.

In various embodiments, the user can invoke, through the GUI, various application-level functions of the DIVS 1, such as creating a new file folder, adding a document to a file folder, deleting a document from a file folder, relocating a document within a pane, assigning a document to a different category/pane within a file folder, copying a document within a file folder, sending a document in a file folder to a recipient (e.g., as an email attachment), and editing a document within a file folder.

As noted above, the DIVS 1 can be implemented as a standalone application or as part of an existing DMS or file system. In some embodiments or modes of operation, the user is prompted to input a document's category, sequence location, tab label, etc., when the document is first saved in the computer system in which the DIVS 1 is implemented, according to the steps described above. Similarly, in some embodiments or modes of operation, at least some of these steps may be performed automatically by the DIVS 1 when the document is first saved in the computer system in which the DIVS 1 is implemented.

Figure 5:
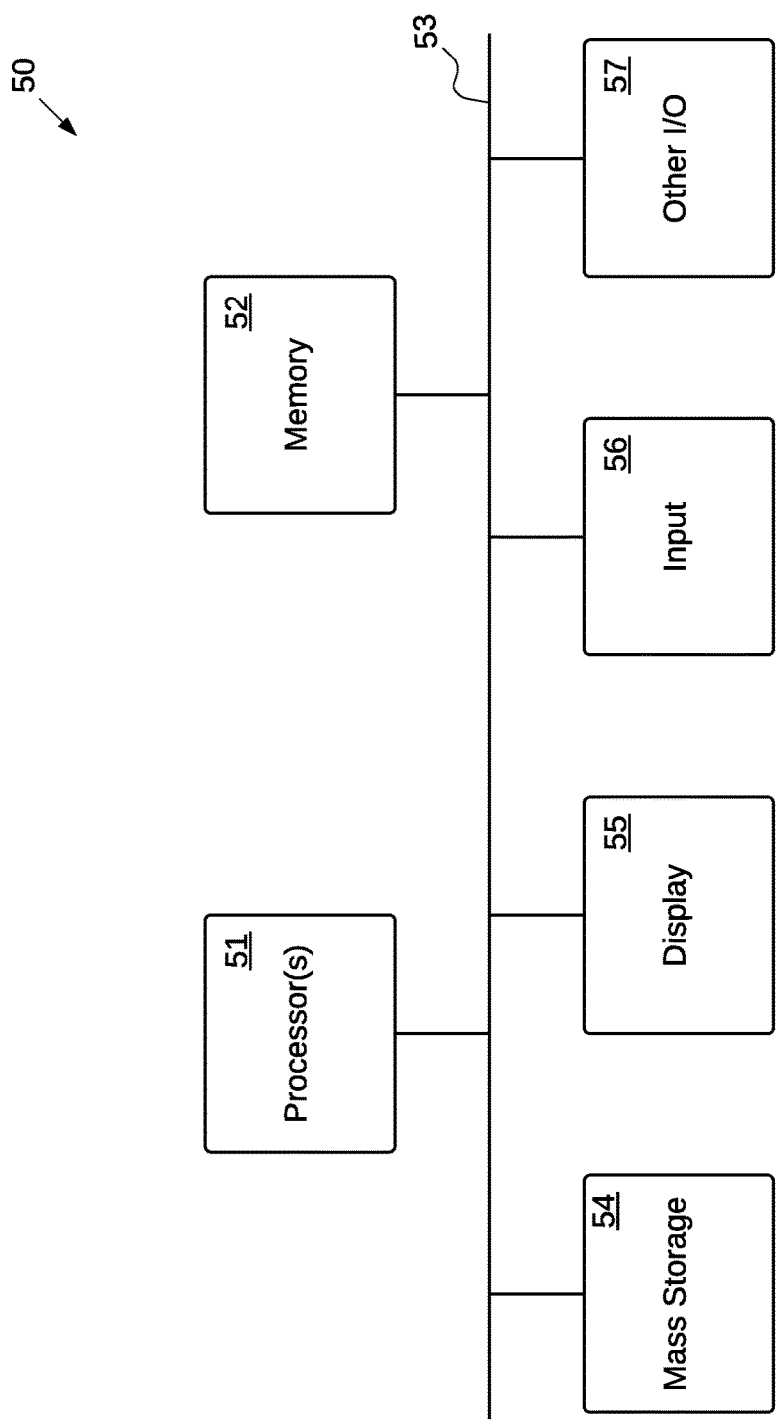
FIG. 5 is a high-level block diagram of an example of a hardware architecture of a processing system in which the DIVS can be implemented.

The DIVS 1 can be implemented in a processing system (e.g., a conventional computer, tablet, wearable device, etc.) at least partially by programmable circuitry (e.g., one or more processors) executing software stored in one or more memories and/or other storage devices. FIG. 5 illustrates at a high-level an example of a hardware architecture of a processing system in which the DIVS 1 can be implemented.

In the illustrated embodiment, the architecture 50 includes one or more processors 51, one or more memories 52, one or more mass storage devices 54, one or more display devices 55, one or more input devices 56, and one or more additional input/output (I/O) devices 57, all coupled to each other through an interconnect 53. The processor(s) 51 control the overall operation of the processing system 50 and can be or include, for example, one or more general-purpose programmable microprocessors, digital signal processors (DSPs), mobile application processors, microcontrollers, application specific integrated circuits (ASICs), programmable logic devices (PLDs), programmable gate arrays (PGAs), or the like, or a combination of such devices.

Memory 52 can be or include one or more physical storage devices, which may be in the form of random access memory (RAM), read-only memory (ROM) (which may be erasable and programmable), flash memory, miniature hard disk drive, or other suitable type of storage device, or a combination of such devices. Mass storage device (s) 54 can be or include, for example, one or more hard drives, digital versatile disks (DVDs), flash memories, or the like. Memory 52 and/or mass storage device(s) 54 can store (individually or collectively) instructions and data that embody the DIVS 1 and that configure the processor(s) 51 to execute operations to implement the techniques described above. The interconnect 53 may be or include one or more conductive traces, buses, point-to-point connections, controllers, adapters and/or other conventional connection devices.

The display device(s) 55 can be or include, for example, one or more devices based on liquid crystal display (LCD), light emitting diode (LED) or organic light emitting diode (OLED) display technology. The input device(s) 56 can be or include, for example, a mouse, touchpad, trackball, touchscreen, or other known or convenient input device. The other I/O device(s) 57 can include one or more of, for example: a data communication device (e.g., an Ethernet adapter, cable modem, Wi-Fi adapter, cellular transceiver, baseband processor, Bluetooth or Bluetooth Low Energy (BLE) transceiver, or the like), audio speakers, keyboard, microphone, camera, etc.

EXAMPLES OF EMBODIMENTS

Certain embodiments of the technology introduced herein are summarized by the following numbered examples:

1. A computer-implemented method comprising: accessing, by a computer system, a plurality of stored electronic documents, each of which has been assigned to a category of a plurality of user-specified categories; associating, by the computer system, each of the user-specified categories with a different pane of a plurality of panes to be displayed; and generating, by the computer system, a graphical user interface (GUI) display that concurrently includes the plurality of panes, wherein each of the electronic documents is included in a corresponding pane associated with a category to which the document has been assigned, such that the electronic documents within each pane are viewable by a user sequentially in response to user inputs according to a previously determined sequence, and such that visual transitions between the electronic documents assigned to each pane are seamless.

2. The computer-implemented method of example 1, wherein the GUI is generated such that the documents within each pane are scrollable by the user so as to have the appearance collectively of being a single multi-page document.

3. The computer-implemented method of example 1 or example 2, further comprising: assigning, by the computer system, each of the electronic documents to a category of the plurality of user-specified categories; and establishing, for each of the user-specified categories, by the computer system, the sequence for the electronic documents in said category.

4. The computer-implemented method of any of examples 1 through 3, wherein two or more electronic documents can be assigned to each of the user-specified document categories.

5. The computer-implemented method of any of examples 1 through 4, wherein said assigning each of the electronic documents to a category is at least partially in response to user inputs assigning one of the documents to one of the categories.

6. The computer-implemented method of any of examples 1 through 5, wherein said assigning each of the electronic documents to a category comprises assigning one of the electronic documents to the category without user inputs indicating that said one of the documents should be assigned to the category.

7. The computer-implemented method of any of examples 1 through 6, wherein said assigning each of the electronic documents to a category comprises automatically assigning one of the electronic documents to a category based on metadata of the document.

8. The computer-implemented method of any of examples 1 through 7, wherein said assigning each of the electronic documents to a category comprises automatically assigning one of the electronic documents to the category based on contents of the document.

9. The computer-implemented method of any of examples 1 through 8, wherein the plurality of document categories are based on types of content in the plurality of documents.

10. The computer-implemented method of any of examples 1 through 9, further comprising: receiving, from a user input device, user inputs that specify at least one of the plurality of categories, the method further comprising assigning each of the electronic documents to a category at least partially in response to the user inputs that specify at least one of the plurality of categories.

11. The computer-implemented method of any of examples 1 through 10, further comprising: assigning a particular document of the plurality of electronic documents to at least two categories of the plurality of categories; and enabling the particular document to be independently and concurrently viewable by the user in each pane that corresponds to one of the at least two categories.

12. The computer-implemented method of any of examples 1 through 11, further comprising: storing the plurality of documents in a single user-defined logical data container; and in response to a user command for opening the logical container, automatically loading at least some of the plurality of documents into a working memory.

13. The computer-implemented method of any of examples 1 through 12, wherein said generating comprises enabling the user to scroll continuously through contents of all of the electronic documents assigned to any of the panes without requiring the user to individually open or identify the electronic documents assigned to said pane.

14. The computer-implemented method of any of examples 1 through 13, further comprising generating at least one of the panes to include an index of the electronic documents assigned to that pane.

15. The computer-implemented method of any of examples 1 through 14, wherein said establishing the sequence for the electronic documents in each category comprises establishing the sequence for the electronic documents in one of the categories automatically based on time/date stamps associated with the documents in the category.

16. The computer-implemented method of any of examples 1 through 15, further comprising: assigning, by the computer system, each of the electronic documents to a category of the plurality of user-specified categories, wherein said assigning includes at least one of: assigning a first document of the plurality of electronic documents to one of the plurality of categories, based on user inputs assigning the first document to a category; or assigning a second document of the plurality of electronic documents to one of the plurality of categories without user inputs specifying a category for the second document; and establishing, for each of the user-specified categories, by the computer system, the sequence for the electronic documents in said category, wherein said establishing the sequence for the electronic documents comprises establishing the sequence for the electronic documents in one of the categories automatically based on time/date stamps associated with the documents in the category.

17. The computer-implemented method of any of examples 1 through 16, further comprising: assigning, by the computer system, each of the electronic documents to a category of the plurality of user-specified categories, including: assigning a first document of the plurality of electronic documents to one of the plurality of categories, based on user inputs assigning the first document to a category; and assigning a second document of the plurality of electronic documents to one of the plurality of categories without user inputs specifying a category for the second document; and establishing, for each of the user-specified categories, by the computer system, the sequence for the electronic documents in said category, wherein said establishing the sequence for the electronic documents comprises establishing the sequence for the electronic documents in one of the categories automatically based on time/date stamps associated with the documents in the category.

18. A computer system comprising: a processor; and a memory accessible to the processor and storing a document integration and viewing system (DIVS), the DIVS configured to receive a plurality of electronic documents of a plurality of different types and to receive user inputs specifying a plurality of document categories, the DIVS including: a parser to identify relevant constituent elements of each of the electronic documents; a document organizer to assign each of the plurality of electronic documents to at least one of a plurality of panes of an application window and to determine a sequence for the documents assigned to each pane, at least one of the panes having assigned thereto documents of at least two types of the plurality of different types; and a graphical user interface (GUI) generator to generate a GUI including the application window, the application window including the plurality of panes, each of the panes corresponding to a different one of the plurality of document categories and capable of displaying content of the electronic documents assigned to the corresponding document category with seamless visual transitions therebetween.

19. The computer system of example 18, further comprising an optical character recognition (OCR) module.

20. A non-transitory machine-readable storage medium storing instructions, execution of which by a computer system causes the computer system to perform steps comprising: accessing, by the computer system, a plurality of stored electronic documents; assigning, by the computer system, each of the electronic documents to an appropriate category of a plurality of user-specified document categories, wherein two or more electronic documents can be assigned to each of the user-specified document categories; establishing, by the computer system, a sequence for the electronic documents in each of the user-specified document categories; and generating, by the computer system, a graphical user interface for display by a display device to a user, the graphical user interface including an application window that includes a plurality of displayable panes, wherein said generating includes assigning each of the user-specified document categories to a different pane of the plurality of panes and assigning each of the electronic documents to the pane assigned to the document category to which the electronic document is assigned; wherein the graphical user interface is generated such that within each pane, all of the electronic documents assigned to the corresponding user-specified document category are sequentially viewable according to the determined sequence without a user having to open or select individually said documents assigned to the corresponding user-specified document category.

21. A system comprising: means for accessing a plurality of stored electronic documents, each of which has been assigned to a category of a plurality of user-specified categories; means for associating each of the user-specified categories with a different pane of a plurality of panes to be displayed; and means for generating a graphical user interface (GUI) display that concurrently includes the plurality of panes, wherein each of the electronic documents is included in a corresponding pane associated with a category to which the document has been assigned, such that the electronic documents within each pane are viewable by a user sequentially in response to user inputs according to a previously determined sequence, and such that visual transitions between the electronic documents assigned to each pane are seamless.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (I) the methods/steps described herein may be performed in any sequence and/or in any combination, and that (ii) the components of respective embodiments may be combined in any manner.

What is claimed is:

1. A computer-implemented method comprising:
   accessing, by a computer system, a plurality of stored electronic documents, each of which has been assigned to a category of a plurality of user-specified categories;
   associating, by the computer system, each of the user-specified categories with a different pane of a plurality of panes to be displayed;
   generating, by the computer system, a graphical user interface (GUI) display that concurrently includes the plurality of panes, wherein each of the electronic documents is associated with and displayable in a corresponding pane associated with a category to which the electronic document has been assigned, and wherein each pane of the plurality of panes is permitted to have two or more of the electronic documents concurrently associated therewith; and
   enabling both random access viewing of, and sequential visual scrolling between, the electronic documents within each pane of the plurality of panes, by a user, in such a manner that for each pane of the plurality of panes, the user does not have to individually request the electronic documents associated with said pane to view contents of the electronic documents associated with said pane.

2. The computer-implemented method of claim 1, wherein the GUI is generated such that the documents within each pane are scrollable by the user so as to have the appearance collectively of being a single multi-page document.

3. The computer-implemented method of claim 1, further comprising:

assigning, by the computer system, each of the electronic documents to a category of the plurality of user-specified categories; and establishing, for each of the user-specified categories, by the computer system, the sequence for the electronic documents in said category.

4. The computer-implemented method of claim 3, wherein two or more electronic documents can be assigned to each of the user-specified document categories.

5. The computer-implemented method of claim 3, wherein said assigning each of the electronic documents to a category is at least partially in response to user inputs assigning one of the documents to one of the categories.

6. The computer-implemented method of claim 3, wherein said assigning each of the electronic documents to a category comprises assigning one of the electronic documents to the category without user inputs indicating that said one of the documents should be assigned to the category.

7. The computer-implemented method of claim 3, wherein said assigning each of the electronic documents to a category comprises automatically assigning one of the electronic documents to a category based on metadata of the document.

8. The computer-implemented method of claim 6, wherein said assigning each of the electronic documents to a category comprises automatically assigning one of the electronic documents to the category based on contents of the document.

9. The computer-implemented method of claim 1, wherein the plurality of document categories are based on types of content in the plurality of documents.

10. The computer-implemented method of claim 1, further comprising:
receiving, from a user input device, user inputs that specify at least one of the plurality of categories, the method further comprising assigning each of the electronic documents to a category at least partially in response to the user inputs that specify at least one of the plurality of categories.

11. The computer-implemented method of claim 1, further comprising:
assigning a particular document of the plurality of electronic documents to at least two categories of the plurality of categories; and
enabling the particular document to be independently and concurrently viewable by the user in each pane that corresponds to one of the at least two categories.

12. The computer-implemented method of claim 1, further comprising:
storing the plurality of documents in a single user-defined logical data container; and
in response to a user command for opening the logical container, automatically loading at least some of the plurality of documents into a working memory.

13. The computer-implemented method of claim 1, wherein said generating comprises enabling the user to scroll continuously through contents of all of the electronic documents assigned to any of the panes without requiring the user to individually open or identify the electronic documents assigned to said pane.

14. The computer-implemented method of claim 1, further comprising:
generating at least one of the panes to include an index of the electronic documents assigned to that pane.

15. The computer-implemented method of claim 1, wherein said establishing the sequence for the electronic documents in each category comprises establishing the sequence for the electronic documents in one of the categories automatically based on time/date stamps associated with the documents in the category.

16. The computer-implemented method of claim 1, further comprising: assigning, by the computer system, each of the electronic documents to a category of the plurality of user-specified categories, wherein said assigning includes at least one of: assigning a first document of the plurality of electronic documents to one of the plurality of categories, based on user inputs assigning the first document to a category; or assigning a second document of the plurality of electronic documents to one of the plurality of categories without user inputs specifying a category for the second document; and establishing, for each of the user-specified categories, by the computer system, the sequence for the electronic documents in said category, wherein said establishing the sequence for the electronic documents comprises establishing the sequence for the electronic documents in one of the categories automatically based on time/date stamps associated with the documents in the category.

17. The computer-implemented method of claim 16, further comprising:
assigning, by the computer system, each of the electronic documents to a category of the plurality of user-specified categories, including:
assigning a first document of the plurality of electronic documents to one of the plurality of categories, based on user inputs assigning the first document to a category; and
assigning a second document of the plurality of electronic documents to one of the plurality of categories without user inputs specifying a category for the second document; and
establishing, for each of the user-specified categories, by the computer system, the sequence for the electronic documents in said category, wherein said establishing the sequence for the electronic documents comprises establishing the sequence for the electronic documents in one of the categories automatically based on time/date stamps associated with the documents in the category.

18. A computer system comprising:
a processor; and
a memory accessible to the processor and storing a document integration and viewing system (DIVS), the DIVS configured to receive a plurality of electronic documents of a plurality of different types and to receive user inputs specifying a plurality of document categories, the DIVS including:
a parser to identify relevant constituent elements of each of the electronic documents;
a document organizer to assign each of the plurality of electronic documents to at least one of a plurality of panes of an application window and to determine a sequence for the documents assigned to each pane, at least one of the panes having assigned thereto documents of at least two types of the plurality of different types; and
a graphical user interface (GUI) generator to generate a GUI including the application window, the application window including the plurality of panes, each of the panes corresponding to a different one of the plurality of document categories and capable of displaying content of the electronic documents assigned to the corresponding document category in a manner that enables both random access viewing of, and sequential visual scrolling between, the electronic documents within each pane of the plurality of panes, by a user, and such that for each pane of the plurality of panes, the user does not have to individually request electronic documents associated with said pane to view contents of the electronic documents associated with said pane.

19. The computer system of claim 18, further comprising an optical character recognition (OCR) module.

20. A non-transitory machine-readable storage medium storing instructions, execution of which by a computer system causes the computer system to perform steps comprising:

accessing, by the computer system, a plurality of stored electronic documents;

assigning, by the computer system, each of the electronic documents to a category of a plurality of user-specified document categories, wherein two or more electronic documents can be assigned to each of the user-specified document categories;

establishing, by the computer system, a sequence for the electronic documents in each of the user-specified document categories; and generating, by the computer system, a graphical user interface for display by a display device to a user, the graphical user interface including an application window that includes a plurality of displayable panes, wherein said generating includes assigning each of the user-specified document categories to a different pane of the plurality of panes and assigning each of the electronic documents to the pane or panes assigned to the document category or categories, respectively, to which the electronic document is assigned, wherein the graphical user interface is generated such that within each pane, contents of all of the electronic documents assigned to the corresponding user-specified document category can be viewed by a user by random access or sequentially according to the determined sequence, and wherein the electronic documents associated with each pane are viewable in said pane sequentially without the user having to open or select individually said documents assigned to the corresponding user-specified document category.

\* \* \* \* \*